Patented Oct. 2, 1928.

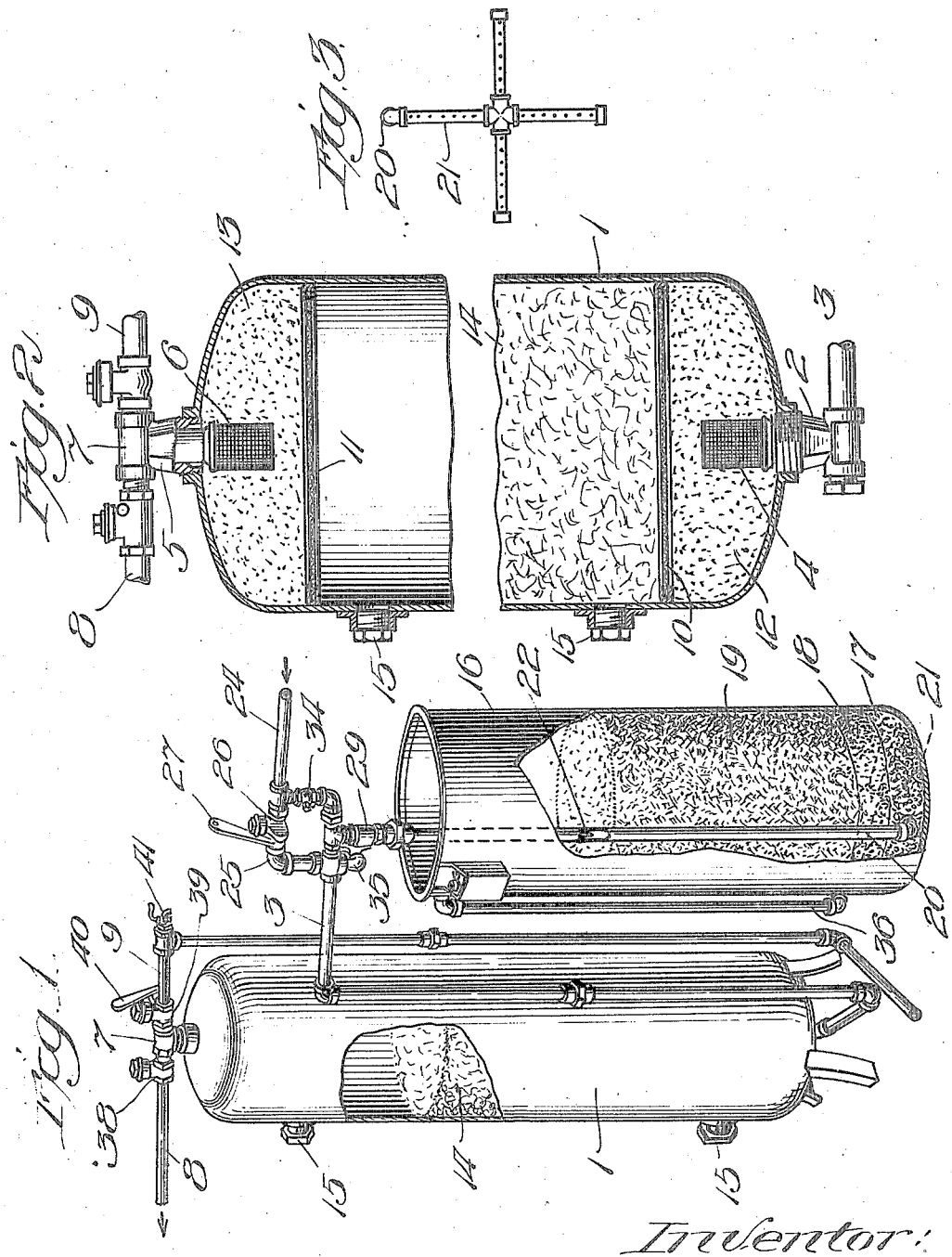

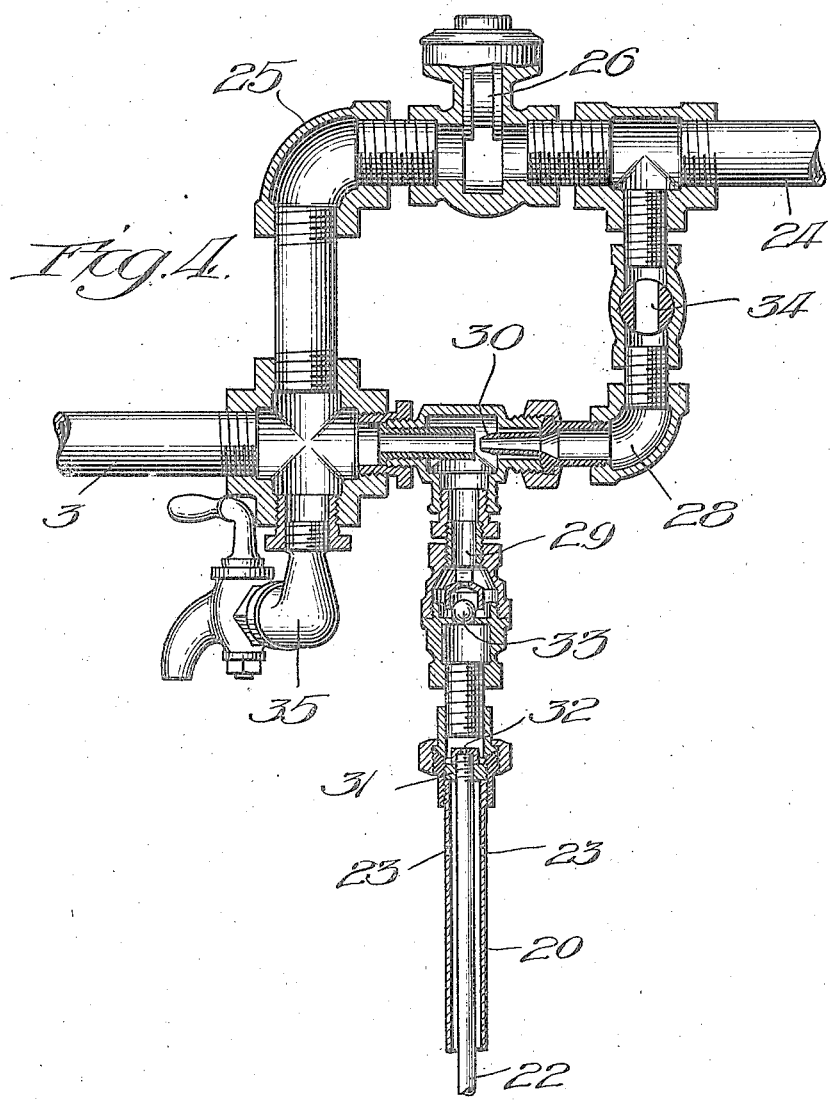

1,685,816

UNITED STATES PATENT OFFICE.

WILLIAM J. KENNEY, OF CHICAGO, ILLINOIS, ASSIGNOR TO ZEOLITE ENGINEERING CO., A CORPORATION OF ILLINOIS.

WATER-SOFTENING APPARATUS.

Application filed July 2, 1924. Serial No. 723,707.

The present invention relates particularly to water softeners in which the water to be treated is caused to flow through a mass of zeolitic material and it has for its object to simplify and improve the construction of the same.

After an apparatus of this kind has been in use for a predetermined length of time the zeolitic material must be regenerated by washing it with a salt solution, and the salt solution must then be washed out so as not to contaminate the water intended for consumption. Viewed in one of its aspects the present invention may be said to have for its object to produce a simple and novel water softening system, so designed that the regeneration and subsequent washing may be effected in a simple and convenient manner and require a minimum amount of attention on the part of the user.

It is desirable that the raw water be mechanically filtered before being passed through the mass of zeolitic material, and it is also desirable that the treated water be mechanically filtered before it is delivered to the distributing system. Viewed in one of its aspects, my invention may be said to have for its object to produce a simple and novel reservoir construction, containing the zeolitic material and also the mechanical filters, which will permit the same to be shipped from the factory to the consumer in a condition ready for use.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a perspective view, with portions broken away, of an apparatus arranged in accordance with the present invention; Fig. 2 is a vertical section, on an enlarged scale, through the reservoir, only the end portions of the reservoir being shown and the rest being broken away; Fig. 3 is a bottom plan view of the inlet to the brine-discharging pipe in the brine tank and Fig. 4 is a sectional view through the siphoning apparatus by means of which either water to be treated or brine, or washing water is delivered to the reservoir.

In the drawings I have illustrated my invention as applied to an upflow softener and, for the sake of brevity, I shall restrict the detailed description to this particular form of apparatus; although it should be understood that the invention is not limited to softeners in which the water flows in the upward direction, but is applicable to other types.

Referring to the drawings, 1 represents a reservoir which is conveniently made in the form of an elongated cylindrical shell closed at both ends. Screwed into the bottom of the reservoir is a fitting 2 connected to an inlet pipe 3, the fitting having a strainer 4 located within the reservoir. The parts are so proportioned that the strainer is movable into and removable from the reservoir with the fitting 2. Screwed into the top of the reservoir is a second fitting, 5 similar to the fitting 2 and provided with a strainer 6 similar to the strainer 4. The outer end of the fitting 5 terminates in a T 7 into one end of which is screwed a pipe 8 for distributing softened water, while to the other end is attached a waste pipe 9. Extending across the interior of the reservoir, a short distance from the bottom and a short distance from the top, are open work partitions 10 and 11, respectively, these being conveniently in the form of wire screens permanently attached at their edges to the walls of the reservoir. The spaces between the ends of the reservoir and the partitions are filled with a filtering material, preferably gravel, as indicated at 12 and 13. The gravel may be introduced, before the fittings 2 and 5 are applied, through the openings into which these fittings are screwed. In the main portion of the reservoir, that is in the space between the two partitions, is a deep bed 14 of zeolitic material, the quantity of this material being such that when the reservoir is in an upright position a considerable free space is left in the reservoir between the top of the bed of zeolitic material and the upper transverse partition. The zeolitic material may be introduced into and removed from the reservoir through either or both of two openings in the sides of the reservoir, which openings are normally closed by means of plugs 15.

It will thus be seen that the reservoir may be completed in the factory and shipped to the customer with its contents in place, ready for use; the fittings 2 and 5 being left off and the openings therefor in the reservoir being closed by means of temporary plugs.

Independent of the treating reservoir is a brine tank 16 that is preferably located near the reservoir, the tank preferably having a salt capacity much greater than that required for a single regeneration of the zeolitic material. This tank may conveniently be a simple receptacle, of any desired shape, open at the top. Ordinary rock salt is usually employed to make the brine and, since it contains more or less dirt or other impurities that should not be carried into the treating reservoir, it is preferable that the brine solution be strained or mechanically filtered before being discharged into the reservoir. To this end I have placed in the bottom of the tank a suitable filtering material. In the arrangement shown, there is a bottom layer of gravel 17 above which is placed a layer of sand 18. The salt 19 overlies the filtering bed. The brine solution is withdrawn through a vertical pipe 20 having at the lower end a foot 21 made out of perforated pipes, this foot resting on the bottom of the tank. Consequently any brine that enters the pipe 20, as will hereinafter be described, must first pass down through the filtering bed. The pipe 20 serves only as an outlet for the actual discharge pipe for the brine. As shown in Figs. 1 and 4, there is a small pipe or tube 22 extending downwardly into the pipe 20. The pipe 22 terminates above the middle of the tank, in the arrangement shown, and the bed of salt should not be allowed to rise above the plane of the lower end of this pipe, so as to leave in the upper portion of the tank a free space for water. As best shown in Fig. 4, there is communication between the upper end of the pipe 20 and atmosphere, through holes 23 bored through the wall of the pipe.

The water for the system is delivered through a pipe 24 from which there are two passages leading to the pipe 3 that is connected with the bottom of the reservoir. One of these passages, conveniently made of pipes and pipe fittings, and indicated as a whole at 25, contains a gate valve 26 provided with an operating handle 27. When this valve is open, a free flow of water is permitted from the pipe 24 to the inlet pipe 3. The other passage, indicated as a whole by the character 28, has a branch 29, connected to the upper end of the pipe 20 in the brine tank. In the passage 28, directly above the upper end of the passage 29, is an injector nozzle 30 having a comparatively small opening therethrough. Therefore, when water flows through the passage 28 its volume is restricted by the nozzle and the flow through the pipe 3, produced in this manner, will be much less than the flow through the other passage when the gate valve is open. The injector has the function of creating a partial vacuum in the passage 29 and therefore in the pipe 22, the upper end of which extends through and beyond a sealing plug 31 at the upper end of the pipe 20. It will be seen that on the extreme upper end of the pipe 22 is a cap containing a small port 32, while in the passage 29, is a downwardly-seating check valve 33. It will also be seen that there is a cock 34 in the passage 29, between the pipe 24 and the injector. A faucet 35 is connected to the piping at the junction of the passages 25 and 28 with the pipe 3, this faucet being so positioned that when it is opened, water will flow therefrom into the brine tank. The brine tank is provided with an overflow pipe 36.

In the service pipe 8 leading from the top of the reservoir is a check valve 38 adapted to prevent back flow into the reservoir. In the pipe 9, adjacent to the connection thereof with the top of the reservoir, is a gate valve 39 provided with a handle 40; this gate valve being similar to the valve 26. At some convenient point in the pipe 9 is a small drain cock 41.

After the apparatus has been set up as shown in Fig. 1, the brine tank being filled to the proper level with salt, the gate valve 26 is opened. Water now flows from the pipe 24 through both the passages 25 and 28 into the pipe 3 and then into the bottom of the reservoir, rising through the lower filter and through the bed of zeolitic material where the softening is effected, and the softened water then rising through the upper filter. If no water is being withdrawn from the service pipe this inflow will continue until the reservoir becomes full of water. When a faucet or other outlet associated with the service pipe 8 is opened, the pressure of the incoming water will force the softened water out of the top of the reservoir into the service pipe. Whenever the outlet from the service pipe is closed, stopping the flow of water from the reservoir, the flow of water into the reservoir also ceases. Water is thus automatically softened as it is required for use. After a time, depending upon the rate of consumption of water, the zeolitic material deteriorates and it must then be regenerated. Upon opening the faucet 35, water will flow into the brine tank and, since there is in the salt more or less dirt that rises in the form of a scum, the water is preferably allowed to overflow to some extent in order to carry away this scum. After the brine tank has been filled with water, a short interval of time, say fifteen minutes, should be allowed to elapse before the regenerating operation is begun. Then, when the water has become a saturated solution, the gate valve 39 is opened and the gate valve 26 is closed. Water can now flow from the pipe 24 to the pipe 3, only through the passage 28, in restricted volume. Such a flow is permitted because the waste pipe 9 from the reservoir is in open communication with the latter and, as liquid enters the bottom of the reservoir, water will flow out of the top and be discharged through the pipe 9; the pressure in the distribution system holding the check valve 38 closed and preventing the water that is leaving the reservoir from entering the service system. As the water flows through the injector in the passage 28, it creates a suction which causes brine to be drawn up through the pipe 20 and thence into and through the pipe 22, this brine rising through the passage 29 and mingling with the water being discharged by the injector nozzle. The water that flows through the pipe 3 and into the reservoir is therefore a dilute salt solution or brine. The rate of flow of the water may be controlled by the cock 34. This is an important feature because waters that require softening differ widely in their characteristics in different locations and therefore whenever a system is installed it will ordinarily be necessary to make two or three trails to insure that the salt solution is being delivered in the most effective manner; regulation being effected by turning the cock 34 so as to vary the effective cross-sectional area of that portion of the passage 28 between the supply pipe 24 and the injector. After the proper adjustment has once been secured, no further adjustment is needed. The brine or salt solution continues to be drawn up and be mixed with the raw water, until the level of the brine in the tank falls below the lower end of the pipe 22. When this occurs, the water seal is broken and there is no longer a vacuum and nothing but air could be drawn up through the pipe 22. When the system is restored to service condition a back pressure is set up, closing the check valve 33 and preventing the rise of air and also downflow of water into the brine tank through the passage 29. At the time the brine ceases to flow, the reservoir is full of salt water, and this must be discharged before softened water can be dispensed. However, without any further act on the part of the user, such elimination of salt water from the reservoir is effected. It will be seen that the comparatively small stream of water through the passage 28 will continue even after the flow of salt water ceases, and consequently plain raw water will be delivered by the pipe 3 into the reservoir, this water rising and driving the brine upwardly and out through the waste pipe. The rate of flow during this washing process is not great and therefore no considerable loss results even though the user should forget to return the system to service condition and permit the washing operation to continue a short time after complete washing had been accomplished. The user will soon know how long it takes to regenerate and wash out but, if he desires, he may test the waste water leaving the reservoir, by opening the small cock 41 and testing the water discharged thereby. When the washing process has been completed, the gate valve 39 is closed and the gate valve 26 is opened, so that thereafter the operation will be that heretofore described in connection with ordinary service conditions.

It will be seen that since the siphoning of brine continues only until the brine falls below a predetermined level, the user will be assured that the proper amount of brine for a regenerating operation will be delivered to the reservoir as long as the tank is filled with water to the overflow level at the beginning. It will also be seen that the tank may be made of any desired size so that a single charge of salt will serve to perform several regenerating operations, thereby making it unnecessary to add salt for each regeneration. Therefore, since salt may be added whenever it is convenient, all that is necessary for the user to do in order to regenerate, is to let water run into the tank until it overflows, operate the gate valves 26 and 39 and, after a predetermined interval, again close the gate valves. Since the waste of water used in washing out the salt in the reservoir will not be large even though the valves 26 and 39 be not operated at exactly the right time, it is only necessary for the user to reset these valves within a reasonable time after the washing has been completed. The system as a whole is therefore substantially "fool proof" and, because of its convenience of assembly at the place of use, and the convenience of operation, it may be used most advantageously in resistance and other places where the consumption of water is not great.

There are two factors that must be taken into consideration in connection with the salt in regenerating the zeolitic material namely the quantity of salt and the length of time the salt is in contact with the material that is being regenerated. The quantity of salt is determined by the elevation of the lower end of the pipe 22 and the time element depends on the rate of flow of the water through the injector. By adjusting the cock 34 in the passage 28, the rate of flow of water through the injector nozzle may be varied, thus insuring that the necessary quantity of brine will be withdrawn from the brine tank during a time interval not too long or too short to give the best results.

While I have illustrated and described with particularity only a single preferred form of my invention I do not desire to be limited to the specific structural details thus illustrated and described; but intend to cover all forms and arrangements coming within the definitions of my invention constituting the appended claims.

I claim:

1. In combination, a treating reservoir, a brine tank, a siphon pipe having its inlet end arranged in and terminating a considerable distance above the bottom of the tank so as to be open to atmosphere when the liquid level in the tank falls to a predetermined point, a water pipe connected to the outlet end of the siphon pipe and to the reservoir, and means associated with said water pipe to produce a suction in said siphon pipe.

2. In combination, a treating reservoir, a brine tank, a siphon pipe having its inlet end arranged in and terminating a considerable distance above the bottom of the tank so as to be in communication with atmosphere when the liquid in the tank falls below a predetermined level, a water pipe leading to the reservoir, a connection between the upper end of the siphon pipe and the water pipe, and an injector device in said water pipe at said connection.

3. In combination, a treating reservoir, a brine tank, a siphon pipe having its inlet end arranged in and terminating a considerable distance above the bottom of the tank so as to be in communication with atmosphere when the liquid in the tank falls below a predetermined level, a water pipe leading to the reservoir, a connection between the upper end of the siphon pipe and the water pipe, an injector device in said water pipe at said connection, and a valved bypass in said water pipe around said connection to permit an unrestricted flow of water when the bypass is opened and limit the flow of water to that going through the injector device when the bypass is closed.

4. In combination, a treating reservoir having an outlet, a service pipe and a waste pipe connection to said outlet, a check valve in said service pipe, a shut-off valve in said waste pipe, a water supply pipe leading to said reservoir, a brine tank, a siphon pipe having its inlet end arranged in and terminating a considerable distance above the bottom of said tank, a connection between the upper end of the siphon pipe and the water supply pipe, an injector device in said water supply pipe at said connection, a bypass in said supply pipe around said connection to permit an unrestricted flow of water when the bypass is open, and a shut-off valve in said bypass.

5. In an apparatus of the character described, a brine tank, a pipe arranged in said tank and extending from the bottom to the top thereof, said pipe being provided at its lower end with a brine inlet and at an upper level with an air inlet, and a siphon pipe extending down through the aforesaid pipe and having an inlet opening at a point far above the bottom of the tank.

In testimony whereof, I sign this specification.

WILLIAM J. KENNEY.